United States Patent
Lin et al.

(10) Patent No.: US 11,487,167 B2
(45) Date of Patent: Nov. 1, 2022

(54) METHOD FOR FABRICATING LIQUID CRYSTAL PHASE MODULATION DEVICE HAVING SPACER IN LIQUID CRYSTAL LAYER

(71) Applicant: Liqxtal Technology Inc., Tainan (TW)

(72) Inventors: Chih-Chan Lin, Tainan (TW); Yu-Ching Chen, Tainan (TW)

(73) Assignee: Liqxtal Technology Inc., Tainan (TW)

( * ) Notice: Subject to any disclaimer, the term of this patent is extended or adjusted under 35 U.S.C. 154(b) by 0 days.

(21) Appl. No.: 17/129,843

(22) Filed: Dec. 21, 2020

(65) Prior Publication Data

US 2021/0109394 A1    Apr. 15, 2021

Related U.S. Application Data

(62) Division of application No. 16/163,592, filed on Oct. 18, 2018, now Pat. No. 10,901,268.

(51) Int. Cl.
*G02F 1/1339* (2006.01)
*G02F 1/1337* (2006.01)
*G02F 1/01* (2006.01)

(52) U.S. Cl.
CPC ........ *G02F 1/13394* (2013.01); *G02F 1/0107* (2013.01); *G02F 1/133784* (2013.01); *G02F 1/13396* (2021.01); *G02F 1/133738* (2021.01)

(58) Field of Classification Search
CPC ............... G02F 1/13394; G02F 1/0107; G02F 2001/13396
See application file for complete search history.

(56) References Cited

U.S. PATENT DOCUMENTS

| | | |
|---|---|---|
| 2005/0270472 A1 | 12/2005 | Yamada et al. |
| 2009/0015739 A1 | 1/2009 | Shin et al. |
| 2009/0066884 A1 | 3/2009 | Okabe et al. |
| 2010/0033669 A1* | 2/2010 | Iizawa ............... G02F 1/13394 349/155 |
| 2012/0314144 A1* | 12/2012 | Sugita .................... G02B 30/27 349/15 |
| 2015/0370105 A1 | 12/2015 | Hong et al. |
| 2016/0170273 A1 | 6/2016 | Lee et al. |
| 2016/0377901 A1* | 12/2016 | Yen ..................... G02F 1/13394 359/891 |

FOREIGN PATENT DOCUMENTS

| | | | | |
|---|---|---|---|---|
| CN | 10-5158980 | * | 5/2014 | .......... G02F 1/1337 |
| CN | 103913892 A | | 7/2014 | |
| CN | 105158980 A | | 12/2015 | |
| EP | 2565707 A1 | | 3/2013 | |

(Continued)

*Primary Examiner* — Lauren Nguyen
(74) *Attorney, Agent, or Firm* — CKC & Partners Co., LLC

(57) ABSTRACT

A method for fabricating a liquid crystal phase modulation device is provided. The method includes detecting thicknesses of a plurality of portions of a reference liquid crystal layer of a reference liquid crystal phase modulation sample; determining a distribution according to the thicknesses of the portions of the reference liquid crystal layer; forming a plurality of spacers over a first substrate in the determined distribution; and combining the first substrate with a second substrate and a liquid crystal layer to form the liquid crystal phase modulation device.

18 Claims, 15 Drawing Sheets

(56) References Cited

FOREIGN PATENT DOCUMENTS

| | | |
|---|---|---|
| EP | 3076234 A1 | 10/2016 |
| JP | S61-267736 A | 11/1986 |
| JP | 2000227598 A | 8/2000 |
| JP | 2002-202510 A | 7/2002 |
| JP | 2003-5193 A | 1/2003 |
| JP | 2004013098 A | 1/2004 |
| JP | 2008083366 A | 4/2008 |
| JP | 2013-122471 A | 6/2013 |
| JP | 2015022195 A | 2/2015 |
| TW | 594335 B | 6/2004 |
| TW | I363894 B | 5/2012 |
| TW | I521283 B | 2/2016 |

* cited by examiner

METHOD FOR FABRICATING LIQUID CRYSTAL PHASE MODULATION DEVICE HAVING SPACER IN LIQUID CRYSTAL LAYER

PRIORITY CLAIM AND CROSS-REFERENCE

This application is a divisional application of U.S. patent application Ser. No. 16/163,592, filed Oct. 18, 2018, which is herein incorporated by reference in its entirety.

BACKGROUND

Field of Invention

The present disclosure relates to a method for fabricating a liquid crystal phase modulation device.

Description of Related Art

Electrically tunable optical phase modulator includes an optoelectronic material layer (i.e., liquid crystal material) having refractive index tunable based on the electric field. By designing suitable shapes of electrodes, when a specific voltage(s) is applied thereon, a phase difference distribution of the optoelectronic material layer can be made to realize various optical effects. For example, the optoelectronic material layer can imitate an optical element, such as a lens, a grating, and a switch.

SUMMARY

In some embodiments of the present disclosure, spacers are distributed in response to the bending of the substrate, so as to keep a cell gap of a liquid-crystal device uniform. Furthermore, the spacers are designed to have a shape less influencing a rubbing procedure, such that a rubbed alignment layer can effectively align the liquid crystal molecules.

According to one embodiment of the present disclosure, A method for fabricating a liquid crystal phase modulation device is provided. The method includes detecting thicknesses of a plurality of portions of a reference liquid crystal layer of a reference liquid crystal phase modulation sample; determining a distribution according to the thicknesses of the portions of the reference liquid crystal layer; forming a plurality of spacers over a first substrate in the determined distribution; and combining the first substrate with a second substrate and a liquid crystal layer to form the liquid crystal phase modulation device.

According to one embodiment of the present disclosure, A method for fabricating a liquid crystal phase modulation device is provided. The method includes fabricating a reference liquid crystal phase modulation sample by combining a first reference substrate, a second reference substrate, a reference sealant, and a reference liquid crystal layer; detecting thicknesses of a plurality of portions of the reference liquid crystal layer of the reference liquid crystal phase modulation sample; determining a distribution according to the thicknesses of the portions of the reference liquid crystal layer; forming a plurality of first spacers over a first substrate in the determined distribution; and combining the first substrate, a second substrate, a device sealant, a liquid crystal layer to form the liquid crystal phase modulation device, wherein the device sealant has a thickness substantially equal to a thickness of the reference sealant.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
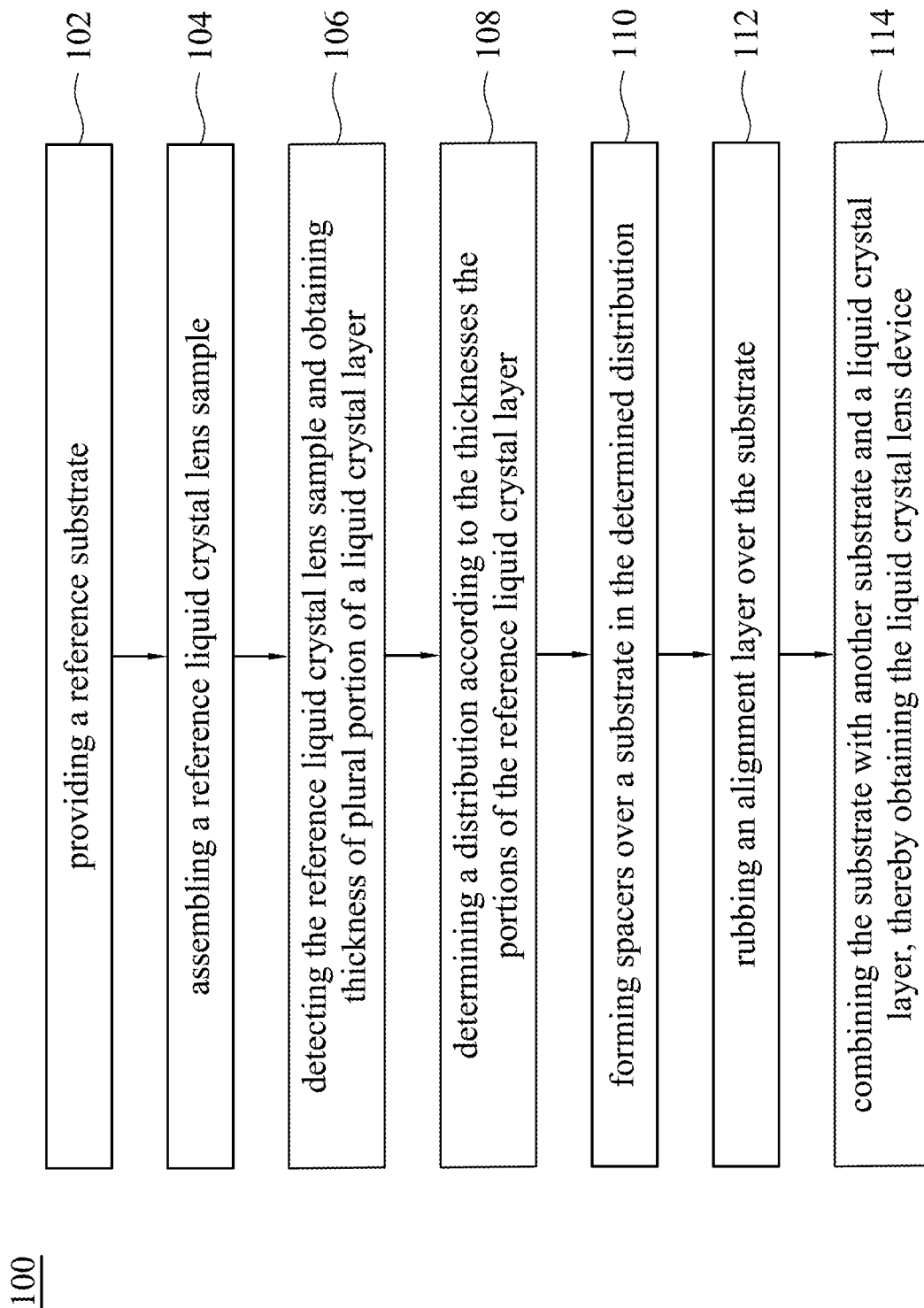
FIG. 1 is a flow chart of a method for fabricating a liquid crystal phase modulation device according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

Figure 2A:
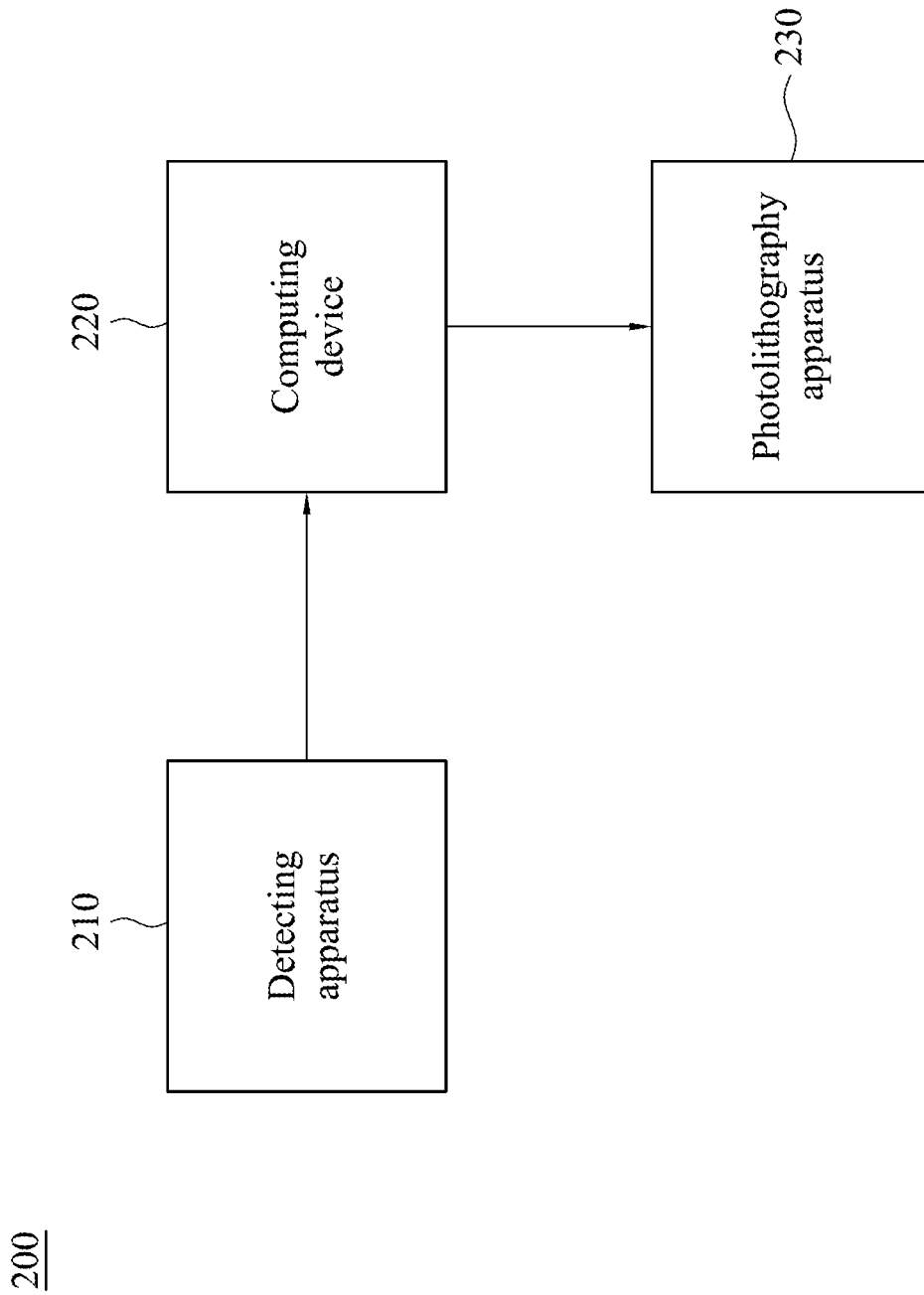
FIG. 2A is a system for fabricating a liquid crystal phase modulation device according to some embodiments of the present disclosure.

FIG. 1 is a flow chart of a method 100 for fabricating a liquid crystal phase modulation device 400 according to some embodiments of the present disclosure. FIG. 2A is a system 200 for fabricating a liquid crystal phase modulation device 400 according to some embodiments of the present disclosure. FIGS. 3A-3G illustrate intermediate stages of a method for fabricating the liquid crystal phase modulation device 400 according to some embodiments of the present disclosure. The illustration is merely exemplary and is not intended to be limiting beyond what is specifically recited in the claims that follow. It is understood that additional operations may be provided before, during, and after the operations shown by FIG. 1, and some of the operations described below can be replaced or eliminated for additional embodiments of the method. The order of the operations/processes may be interchangeable.

Figure 3A:
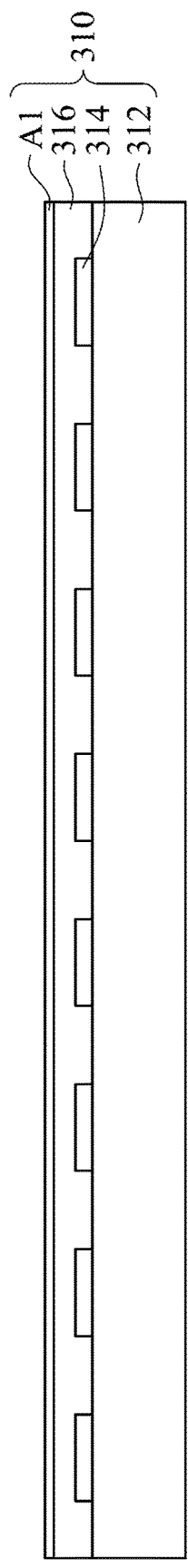
FIGS. 3A-3G illustrate intermediate stages of a method for fabricating a liquid crystal phase modulation device according to some embodiments of the present disclosure.

Referring to FIG. 1 and FIG. 3A, the method 100 begins at step 102 where a substrate 310 is provided. Herein, the substrate 310 includes a base substrate 312, plural electrodes 314 over the base substrate 312, a dielectric layer 316, and an alignment layer A1 thereon. The base substrate 312 may be rigid and/or flexible substrates. For example, the base substrate 312 is made of suitable transparent insulating materials, such as glass, quartz, or polymeric material. The electrodes 314 may be made of suitable transparent conductive materials, such as indium tin oxide (ITO) or antimony tin oxide (ATO). The dielectric layer 316 is made of silicon oxide, polymer, or other suitable dielectric material. The alignment layer A1 may be made of polyimide.

Figure 3B:
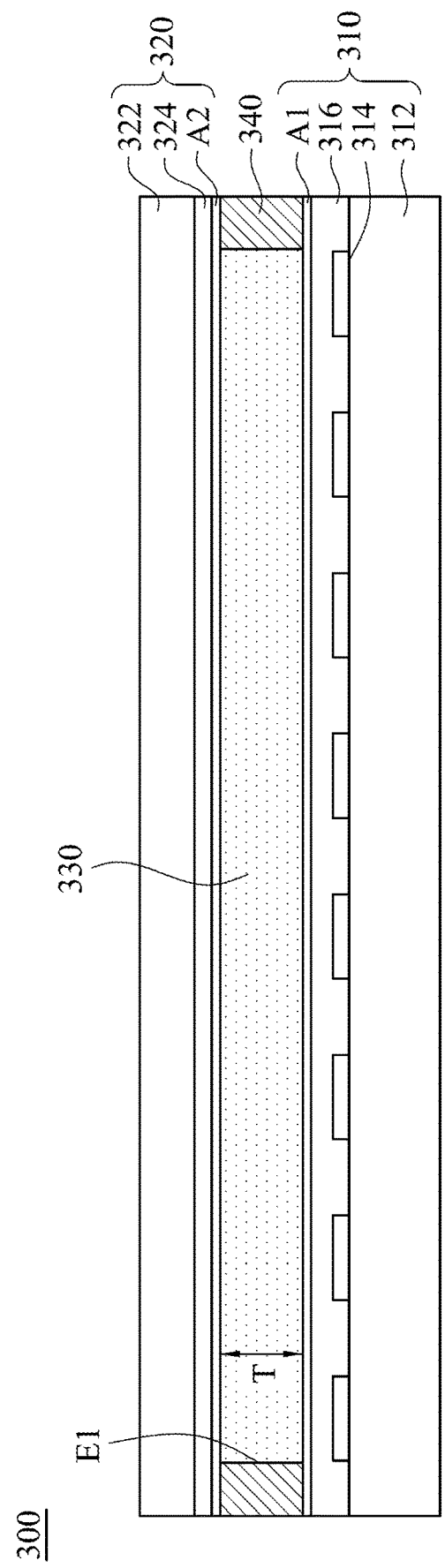

Referring to FIG. 1 and FIG. 3B, the method 100 proceeds to step 104 where a reference liquid crystal phase modulation sample 300 is assembled. To be specific, the reference substrate 310, a substrate 320, a liquid crystal layer 330, and a reference sealant 340 are combined to form the reference liquid crystal phase modulation sample 300. The substrates 310 and 320 are opposite to each other. The liquid crystal layer 330 is between the substrates 310 and 320. The reference sealant 340 is between the substrates 310 and 320 and surrounds the liquid crystal layer 330. The sealant 340 is designed to have a desired thickness for spacing the substrates 310 and 320 from each other, and allowing the liquid crystal layer 330 therebetween to have a corresponding thickness enough to realizing phase modulation, such as lens effect. For example, the thickness of the sealant 340 may be in a range of about 10 micrometers to about 50 micrometers. In some embodiments, a thinning process may be performed to thin the base substrate 312 of the substrates 310 or a base substrate 322 of the substrates 320. In some embodiments, after the assembly, a chipping process may be performed.

Herein, the substrate 320 includes a base substrate 322, an electrode layer 324 over the base substrate 312, and an alignment layer A2 thereon. The base substrate 322 may be rigid and/or flexible substrates. For example, the base substrate 322 is made of suitable transparent insulating materials, such as glass, quartz, or polymeric material. The electrode layer 324 may be made of suitable transparent conductive materials, such as indium tin oxide (ITO) or antimony tin oxide (ATO). The alignment layer A2 may be made of polyimide. The alignment layer A2 may be rubbed in an alignment direction according to the alignment direction AD1 of the alignment layer A1. For example, the alignment direction of the alignment layer A2 may be parallel with the alignment direction AD1 of the alignment layer A1 for a parallel-aligned (PA) liquid crystal configuration. In some other examples, the alignment direction of the alignment layer A2 may be orthogonal to the alignment direction AD1 of the alignment layer A1 for a twisted nematic (TN) liquid crystal configuration.

Figure 3C:
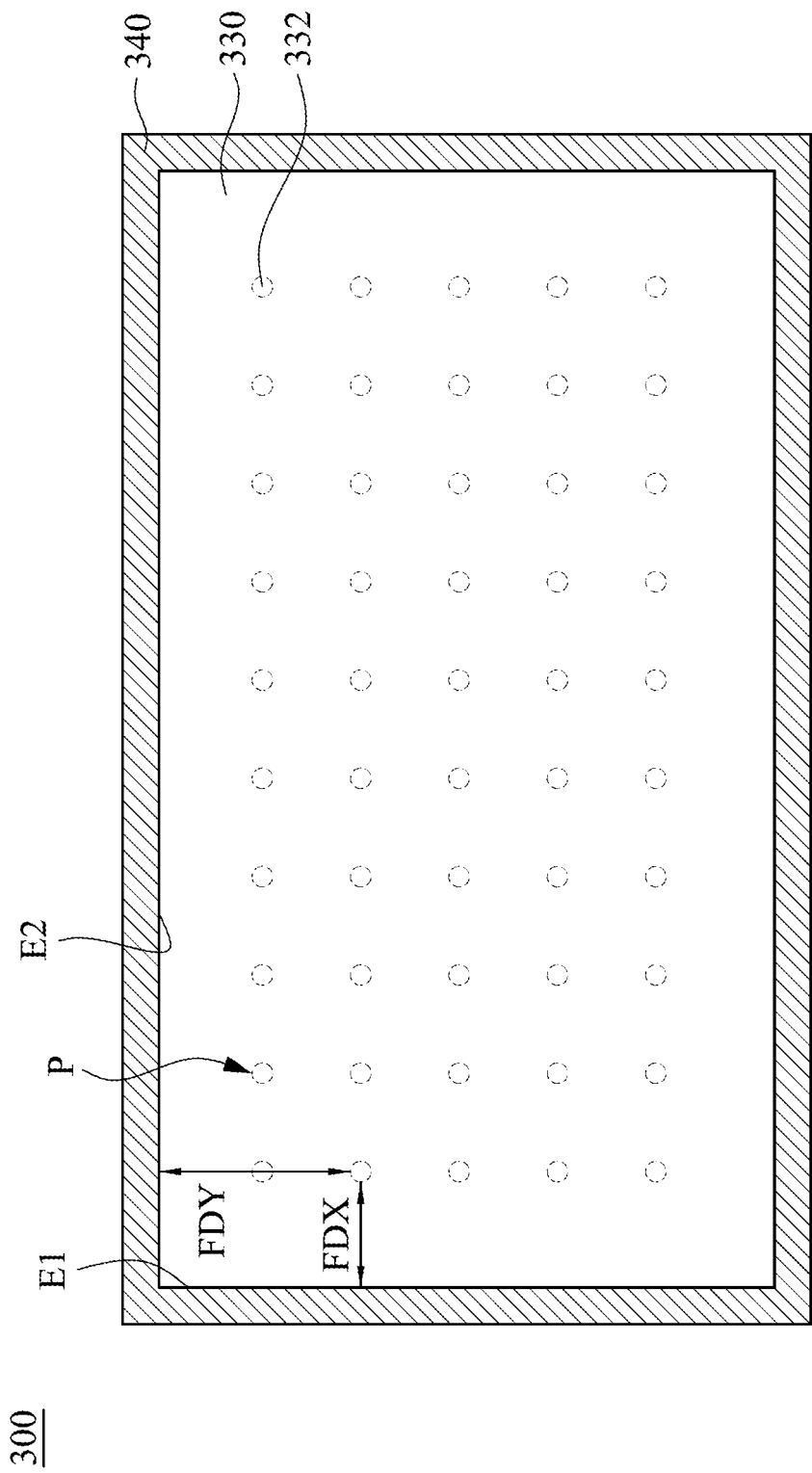

In some embodiments, due to the thin substrates, the large cell gap, and the large area of the reference liquid crystal phase modulation sample 300, the substrates 312 and 322 may bend and the cell gap between the substrates 312 and 322 (e.g., the thickness of the liquid crystal layer 330) may vary at different positions. The bonding of the substrates 312 and 322 may further enhance the non-uniformity of the cell gap therebetween. FIG. 3C is a top view of the reference liquid crystal phase modulation sample 300 of FIG. 3B. For example, in FIG. 3C, the thicknesses of plural portions 332 of the liquid crystal layer 330 at plural various positions P may be different.

Reference is made to FIG. 1, FIG. 2A and FIGS. 3B and 3C. The method 100 proceeds to step 106 where the reference liquid crystal phase modulation sample 300 is detected, so as to obtain thicknesses T of the portions 332 of the liquid crystal layer 330 at positions P. To specific, the system 200 has a detecting apparatus 210 capable of detecting optical properties of the reference liquid crystal phase modulation sample 300 at plural various positions P. By analyzing the detected optical properties of the reference liquid crystal phase modulation sample 300 at plural various positions P, the thicknesses T of portions 332 of liquid crystal layer 330 at the various positions P are obtained.

In the present embodiments, the detected positions P are uniformly distributed and spaced by the same distance. In some other embodiments, the detected positions P may be arranged in a different way, such as random distribution. According to the detecting apparatus 210, the portions 332 may be detected time-sequentially or simultaneously. In some embodiments, for example, the detecting apparatus 210 may be a spectrometer, a spectrophotometer, or other suitable apparatus. In some embodiments, the sealant 340 is detected by suitable optical microscope prior to detecting the thicknesses of the portions 332, and the position of the sealant 340 is marked. The marked position of the sealant 340 may serve as a reference with respect to the positions of portions 332 during detecting the thickness of the portions 332. For example, positions of the inner edges E1 and E2 of the sealant 340 are marked.

The method 100 proceeds to step 108 where a distribution of spacers to be formed is determined according to the detected thicknesses T of the plural portions 332 of the liquid crystal layer 330. For example, the system 200 includes a computing device 220 connected to the detecting apparatus 210. In some embodiments, the computing device 220 includes a processor, memory, and an interface. For example, the computing device 220 may be a single computer or a distributed computer. The computing device 220 receives information (e.g., a signal) of the detected thicknesses T and detected positions P from the detecting apparatus 210 and performing statistical analysis processes, so as to obtain the distribution of spacers to be formed. In some embodiments, the computing device 220 includes one or more software programs for calculating the data.

Figure 2B:
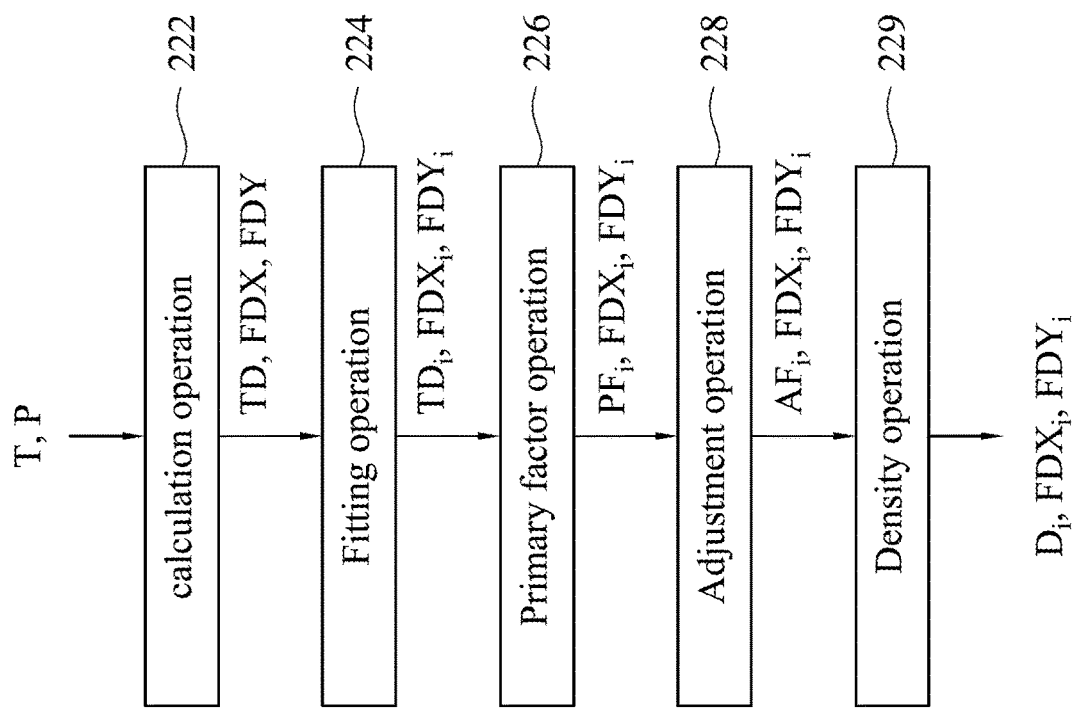
FIG. 2B illustrates operations of a computing device according to some embodiments of the present disclosure.

FIG. 2B illustrates operations 222-229 of the computing device 220 according to some embodiments of the present disclosure. Reference is made to FIG. 2A and FIG. 2B. To be specific, at calculation operation 222, thickness differences TD, horizontal distances FDX, and vertical distances FDY at the detected positions P are obtained by calculating the positions P and the detected thickness T. In the present embodiments, at one of the positions P, the thickness difference TD is referred to as the difference between a desired thickness of the liquid crystal layer 330 and the detected thickness T of the liquid crystal layer 330 at said one of the positions P in FIG. 3B. The horizontal distance FDX is referred to as a distance between said one of the positions P and an edge E1 of the sealant 340 in FIG. 3C. The vertical distance FDY is a distance between said one of the positions P and an edge E2 of the sealant 340 in FIG. 3C.

Subsequently, the computing device 220 builds a relationship between the distances FDX/FDY and the thickness differences TD at the detected positions P, for example, by a fitting operation 224. In some embodiments, the relationship is linear and described in formula (a):

$$TD_i = a \times FDX_i + b$$

$$TD_i = a \times FDY_i + b$$

Where a and b are parameters, and i is a positive integral indicating the number of the positions of the liquid crystal layer 330 to be count. Through the relationship, the thickness differences $TD_i$ of the liquid crystal layer 330 at any positions (e.g., positions with distances $FDX_i$ and/or $FDY_i$ from the sealant 340) can be simulated and obtained. As the above definitions, the thickness difference $TD_i$ is referred to as the difference between the desired thickness of the liquid crystal layer 330 and a simulated thickness of the liquid crystal layer 330, and distances $FDX_i$ and/or $FDY_i$ is referred to as a distance between the simulated position and an edge E1/E2 of the sealant 340 in FIG. 3C.

Then, a primary factor operation 226 is performed for finding primary factors $PF_i$. The primary factors $PF_i$ are used to describe local variation of the densities of spacers to be formed. It is designed that densities of spacers to be formed is proportional to a reciprocal of the thickness differences $TD_i$ in some examples. For example, herein, the primary factors $PF_i$ may be described by the formula (b), based on a ratio of the thickness differences $TD_i$ and the maximum of the thickness differences $TD_i$. For example, formula (b) is described as:

$$PF_i = \left(\frac{TD_i}{(TD_i)_{max}}\right)^{-1} = \frac{(TD_i)_{max}}{TD_i}$$

An adjustment operation 228 is performed for adjusting the primary factors $PF_i$ by a parameter q, and thereby obtaining adjusted factors $AF_i$. The parameter q corresponds with the materials, dimensions, and thickness of the substrates (e.g. the base substrates). The parameter q is in a range of 0 to 1. For example, the parameter q is equal to 0.5. The adjustment may be described in formula (c):

$$AF_i = PF_i + q \times (100\% - PF_i)$$

Finally, a density operation 229 is performed. Herein, a desired density $D_c$ of spacers to be formed in a center position is determined initially, and then densities of spacers to be formed in other positions (e.g., positions with distances $FDX_i$ and/or $FDY_i$ from the sealant 340) are determined by multiplying the desired density $D_c$ by the adjusted factors $AF_i$. Through the calculation, densities $D_i$ in other positions (e.g., positions with distances $FDX_i$ and/or $FDY_i$ from the sealant 340) are obtained by formula (d). For example, the formula (d) is described as:

$$D_i = D_c \times AF_i$$

In some embodiments of the present disclosure, an example is provided in Table 1, in which the desired density $D_c$ of spacers to be formed in the center position is determined as 10% initially. In some embodiments, the center position is about 17 millimeters away from the edge E1/E2.

TABLE 1

| Distance $FDX_i/FDY_i$ (millimeter) | 2 | 7 | 12 | 17 |
|---|---|---|---|---|
| Thickness difference TDi | 0.2949 | 0.6553 | 1.0157 | 1.3761 |
| Primary factor PFi | 21% | 48% | 74% | 100% |
| adjusted factors AFi | 60% | 74% | 87% | 100% |
| densities Di | 6% | 7.4% | 8.7% | 10% |

Through these operations, an uneven distribution of spacers to be formed is obtained. For example, the density of the spacers to be formed degrades when approaching the edge E1/E2.

Figure 3D:
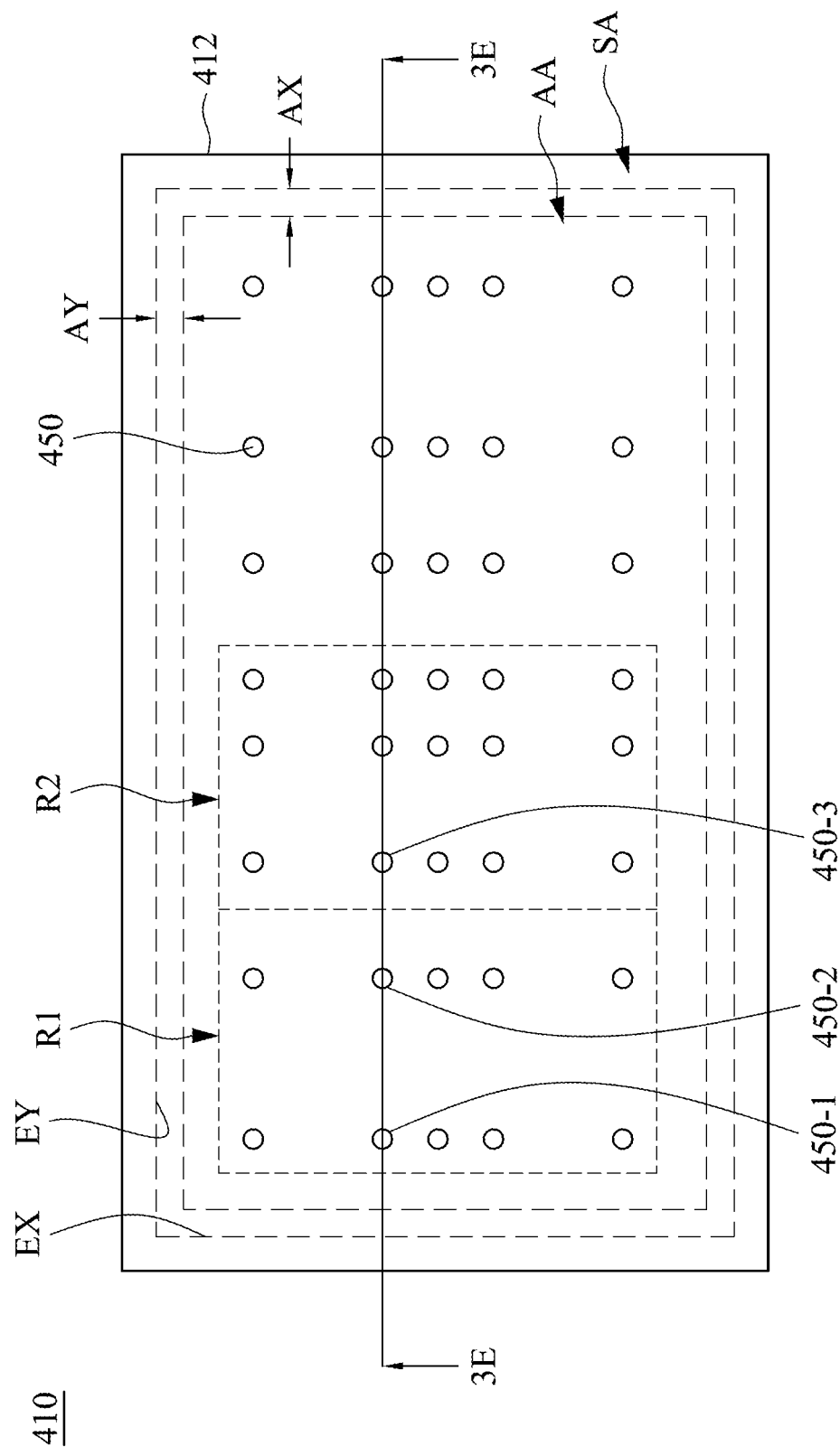
Figure 3E:
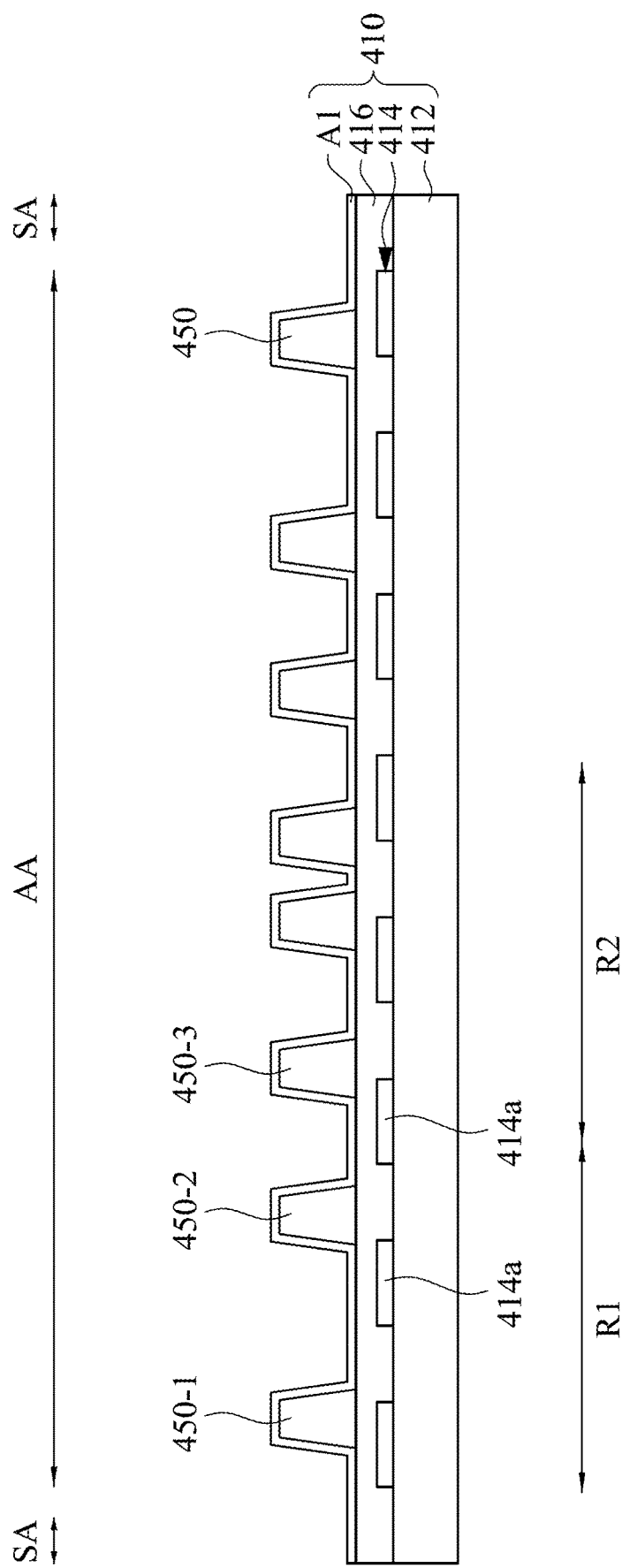

Reference is made to FIG. 1 and FIGS. 3D and 3E. FIG. 3E is a cross-sectional view taken along 3E-3E of FIG. 3D. The method 100 proceeds to step 110 where spacers 450 are formed over a first substrate 410 in the determined distribution. The first substrate 410 includes a base substrate 412, a first electrode layer 414, a dielectric layer 416, and an alignment layer A1. The dielectric layer 416 is formed over the first electrodes 414. The alignment layer A1 is formed over the dielectric layer 416. Herein, the first substrate 410 is provided with an active region AA and a seal region SA surrounding the active region AA. In some embodiments, the active region AA may be designed according to customor's specification. In some embodiments, the active region AA and the seal region SA may have distances AX and AY therebetween, thereby preventing a sealant from being formed in the active region AA. For example, the distances AX and AY is in a range from about 200 micrometers to about 1000 micrometers. In some other embodiments, the active region AA may adjoin the seal region SA, and the distances AX and AY are substantially zero. The first electrode layer 414 is patterned to form first electrodes 414a in the active region AA.

In the present embodiments, the spacers 450 are formed over the dielectric layer 416 in the determined distribution. To be specific, at positions having distances $FDX_i/FDY_i$ (referring to FIG. 2B) from edges EX/EY of the seal region SA, the spacers 450 are formed to have the density $D_i$ (referring to FIG. 2B). For example, the first substrate 410 has a first region R1 and a second region R2. In the horizontal direction, the first region R1 is closer to the seal region SA than the second region R2 is, and a density of the spacers 450 in the second region R2 is greater than a density of the spacers 450 in the first region R1. Through the configuration, the spacers 450 are distributed unevenly.

Herein, the spacers 450 in the first region R1 are distributed unevenly. However, in some other embodiments, the spacers 450 in the first region R1 may be distributed uniformly, the spacers 450 in the second region R2 may be distributed uniformly, and the spacers 450 in the first region R1 have a density lower than that of the spacers 450 in the second region R2.

In some embodiments, the spacers 450 include a first spacer 450-1, a second spacer 450-2, and a third spacer 450-3 arranged in a sequence. That is, the second spacer 450-2 is between and immediately adjacent to the first spacer 450-1 and the third spacer 450-3. In the embodiments, a distance between the first spacer 450-1 and the second spacer 450-2 is different from a distance between the second spacer 450-2 and the third spacer 450-3. For example, herein, the distance between the first spacer 450-1 and the second spacer 450-2 is greater than the distance between the second spacer 450-2 and the third spacer 450-3.

In some embodiments, the spacers 450 may be formed by a photolithography apparatus 230 (referring to FIG. 2A), using suitable photolithography and etching process. For example, an organic layer is formed on the first substrate 410. The organic layer is patterned using a mask to remove portions of the organic layer, the patterned organic layer forms a plurality of spacers 450 at least in the active region AA. In some embodiments, the organic layer may be made of positive photoresist or negative photoresist. In some embodiments of the present disclosure, the spacers 450 are configured to maintain a cell gap. Herein, in the application of liquid crystal phase modulation (e.g., liquid crystal lens), the spacers 450 may have a great height (e.g., 10 micrometers to 50 micrometers), and the spacers 450 has a great width for maintaining itself on the substrate 410 steadily. For example, a width of the spacers 450 is greater than 5 micrometers.

Figure 3F:
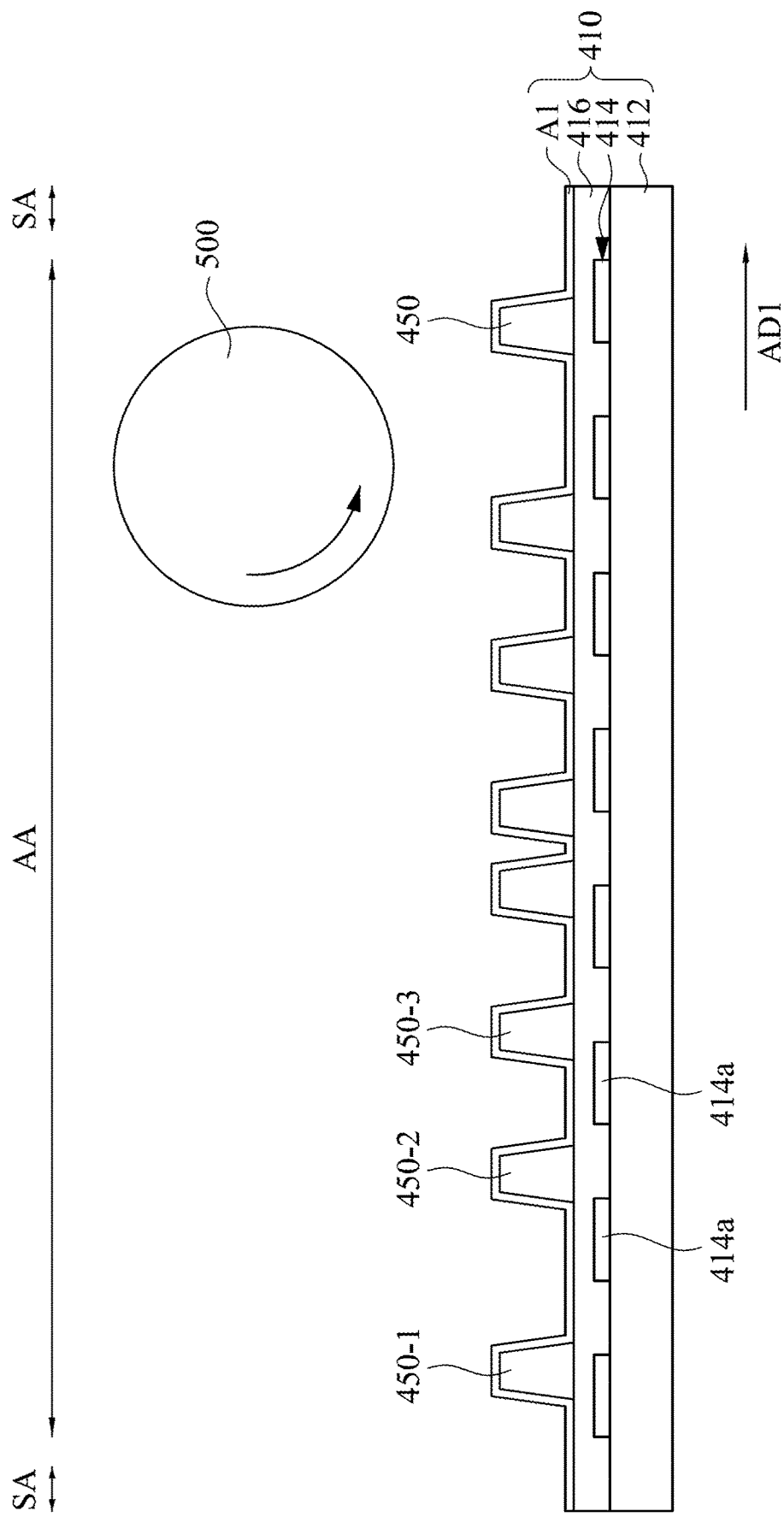

Referring to FIG. 1 and FIG. 3F, the method 100 proceeds to step 112 where a rubbing process is performed to the alignment layer A1. In some embodiments, a rubbing cloth 500 held by a roller is used to rub the alignment layer A1 in an alignment direction AD1. In some cases, because the large-sized spacers 450 may shelter some portions of the alignment layer A1, the portions of the alignment layer A1 may not be rubbed, such that the liquid crystal molecules over the portions of the alignment layer A1 may not lean in the alignment directions AD1.

Figure 7B:
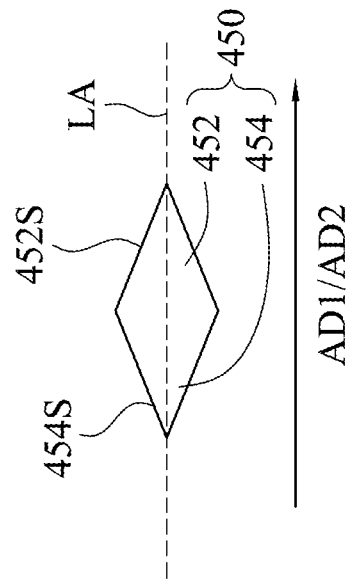
FIGS. 7A and 7B are a schematic top view of a spacer in a liquid crystal phase modulation device according to some embodiments of the present disclosure.
Figure 7A:
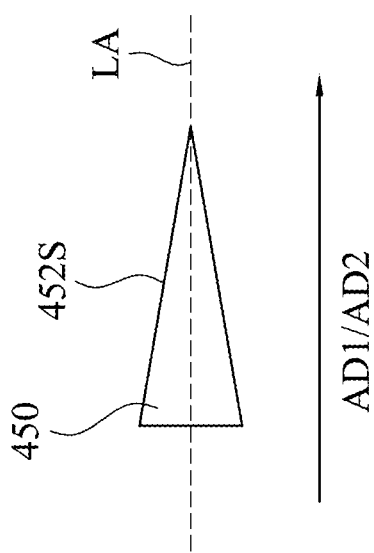

In some embodiments of the present disclosure, referring to FIGS. 7A and 7B, which illustrate schematic top views of one spacer 450, the spacers 450 are designed to have a long axis LA in an alignment direction AD1. That is, spacers 450 extend along the alignment direction AD1. In some embodiments, as shown in FIG. 7A, the width of the spacer 450 narrows in the alignment direction AD1. To be specific, the spacer 450 tapers along the alignment direction AD1. For example, the spacer 450 has edges 452S inclined with respect to the alignment direction AD1 and a vertex of the two edges 452S. Through the configuration, the spacers 450 may shelter less area, and the alignment layer A1 is rubbed more effectively.

In some embodiments, as shown in FIG. 7B, the spacer 450 has portions 452 and 454. The portion 452 faces the alignment direction AD1, while the portion 454 does not face the alignment direction AD1. To be specific, the portion 452 has edges 452S facing the alignment direction AD1, and the portion 454 has edges 454S that does not face the alignment direction AD1. As illustrated in FIG. 7B, the portion 452 of the spacer 450 tapers along the alignment direction AD1, and the edges 452S inclines with respect to the alignment direction AD1. Through the configuration, the spacers 450 may shelter less area, and the alignment layer A1 is rubbed more effectively. Although the spacers 450 may be designed as shown in FIGS. 7A and 7B, it should not limit the scope of the present disclosure. In some other embodiments, the spacers 450 may have other shapes. For example, the spacers 450 may have a circular top view.

Figure 3G:
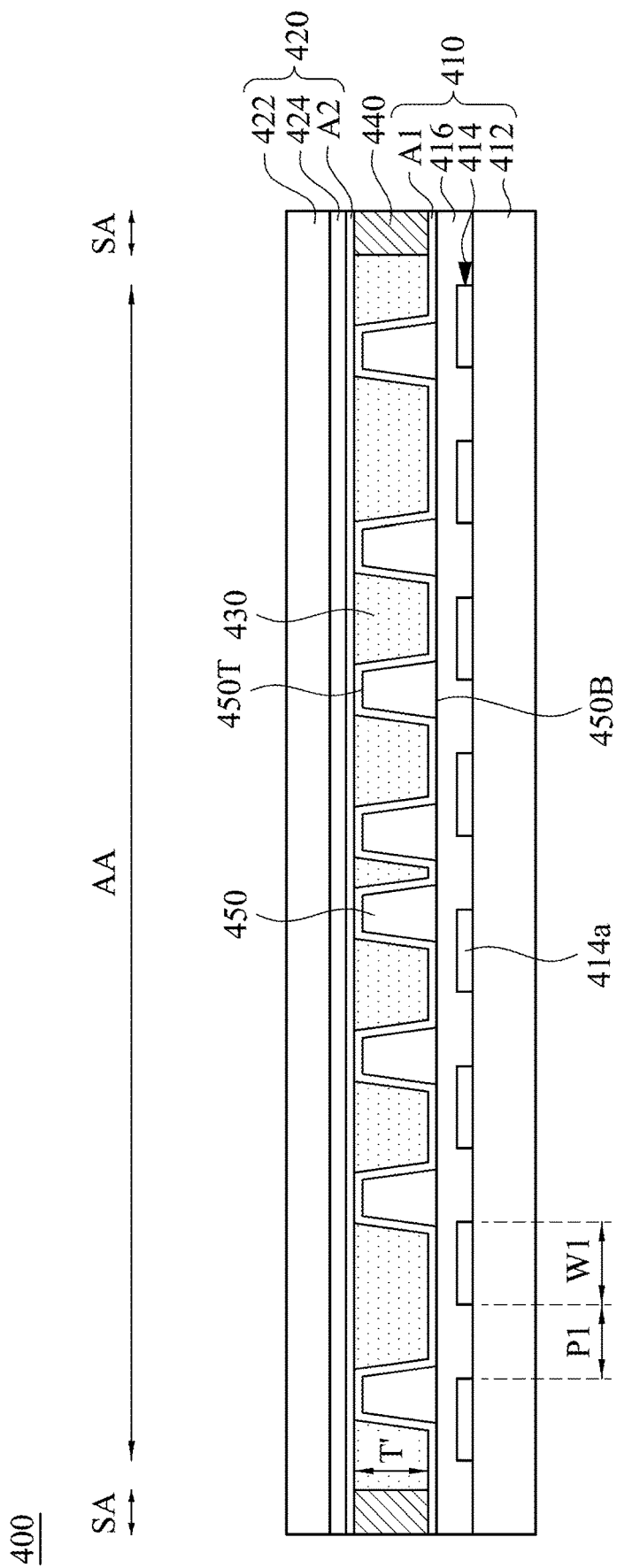

Referring to FIG. 1 and FIG. 3G, the method 100 proceeds to step 114 where the first substrate 410 is combined with a second substrate 420 and a liquid crystal layer 430, thereby obtaining the liquid crystal phase modulation device 400. Herein, the second substrate 420 includes a base substrate 422, a second electrode layer 424, and an alignment layer A2. The second electrode layer 424 is formed over the base substrate 422 and covers the active region AA. The alignment layer A2 is formed over the second electrode layer 424 and rubbed.

As shown in FIG. 3G, a liquid crystal phase modulation device 400 is provided. The liquid crystal phase modulation device 400 includes the first substrate 410, the second substrate 420, the liquid crystal layer 430, a sealant 440, the spacers 450, and the alignment layers A1 and A2. The sealant 440 is in the seal region SA and between the first substrate 410 and the second substrate 420, and surrounds the liquid crystal layer 430. For example, the sealant 440 has inner edges aligned with the edges EX/EY of the seal region SA (referring to FIG. 3D). The first electrode layer 414 has first electrodes 414a in the active region AA, while the second electrode layer 424 covers the active region AA.

In the present embodiments, the spacers 450 have a bottom surface 450B adjacent to the first substrate 410 and a top surface 450T adjacent to the second substrate 420. The bottom surface 450B has a larger area than that of the top surface 450T. Each of the spacers 450 has a height taken perpendicular to the first substrate 410 corresponding to the cell gap, such that the cell gap is maintained by the spacers 450.

In some embodiments of the present disclosure, the first substrate 410, the second substrate 420, the liquid crystal layer 430, and the sealant 440 of the liquid crystal phase modulation device 400 has a configuration similar to the substrate 310, the substrate 320, the liquid crystal layer 330, and the sealant 340 of the reference liquid crystal phase modulation sample 300. For example, the sealant 440 has a thickness equal to that of the sealant 340 of the reference liquid crystal phase modulation sample 300. A thickness of the substrate 410/420 is similar to that of the substrate 310/320. For example, the thickness of the substrate 410/420 is in a range of 0.2 to 0.5 millimeters. Through the configuration, by detecting the reference liquid crystal phase modulation sample 300, an extent of substrate bending is measured, and the spacers 450 are distributed in an uneven distribution in response to the substrate, so as to prevent and reduce the substrate bending and keep a cell gap of a liquid-crystal device uniform.

In the present embodiments, for realizing an electrically tunable phase modulation device (e.g., an electrically tunable lens with a tunable focal length, a electrically tunable grating, or a switch), the liquid crystal phase modulation device 400 is designed with suitable parameters. For example, a thickness T' of the liquid crystal layer 430 is designed to be in a range of about 10 micrometers to about 50 micrometers, such as about 20 micrometers to about 50 micrometers. If the thickness T' of the liquid crystal layer 430 is less than the thickness range, the device may not provide suitable optical power (e.g. lens power) for realizing phase modulation. If the thickness T' of the liquid crystal layer 430 is greater the thickness range, the device may take a long response time to operate and return, which in turn will result in limited applications. In some embodiments, a width W1 of the electrodes 414a is designed to be in a range of about 1 micrometer to hundreds of micrometers, such as about 1 micrometer to about 10 micrometers. In some embodiments, a pitch P1 between the electrodes 414a is designed to be in a range of about 1 micrometer to hundreds of micrometers, such as about 1 micrometer to about 10 micrometers. For example, a length and width of the active area AA may be in a range of about 1 inch to about 2 inches.

In some embodiments, plural liquid crystal phase modulation devices 400 are stacked for enhancing the optical power (e.g., lens power). For example, two to four liquid crystal phase modulation devices 400 are stacked and connected with the active region AA in an overlaying position. In some embodiments, the stacked liquid crystal phase modulation devices 400 may share their base substrates with each other for reducing the overall thickness.

In some embodiments, the liquid crystal phase modulation device 400 may further includes a light shielding layer having an opening corresponding with the active area AA. The light shielding layer may expose at least a portion of the active area AA and shield the seal region SA, so as to prevent the sealant 440 from being observed. For example, the opening of the light shielding layer has an area equal to that of the active area AA. The spacers 450 are disposed in the active area AA but not in the seal region SA, and most of the spacers 450 are not covered by the light shielding layer and may be perceived by users. In some embodiments, fabrication variation may occur at a portion of the active area AA adjacent the seal region SA due to the accuracies of mask alignment and mask dimensions and shadow effect. In some examples, the opening of the light shielding layer may have an area smaller than that of the active area AA, such that the light shielding layer further covers the portion of the active area AA adjacent the seal region SA, which in turn will prevent an undesired performance resulted from the fabrication variation from being observed.

In some embodiments, the light shielding layer may be between the alignment layer A1 and the dielectric layer 416, between the dielectric layer 416 and the substrate 412, between the alignment layer A2 and the second electrode layer 424, or between the second electrode layer 424 and the substrate 422. The light shielding layer has a transmittance lower than 20%. The light shielding layer may be conductive or dielectric materials. For example, in some examples, the light shielding layer is made of opaque inks, such as black inks. In some examples, the light shielding layer is made of metal. In some embodiments, a thickness of the light shielding layer may be greater than about 500 micrometers. In some embodiments, the configuration of the light shielding layer may be omitted, and the non-active area (which is out of the active area AA) may be viewed by users.

In some embodiments of the present disclosure, the base substrates 412 and 422 may be rigid and/or flexible substrates. For example, the base substrates 412 and 422 are made of suitable transparent insulating materials, such as glass, quartz, or polymeric material. The first and second electrode layers 414 and 424 may be made of suitable transparent conductive materials, such as indium tin oxide (ITO) or antimony tin oxide (ATO). The dielectric layer 416 is made of silicon oxide, polymer, or other suitable dielectric material. The alignment layers A1 and A2 may be made of polyimide.

Figure 4A:
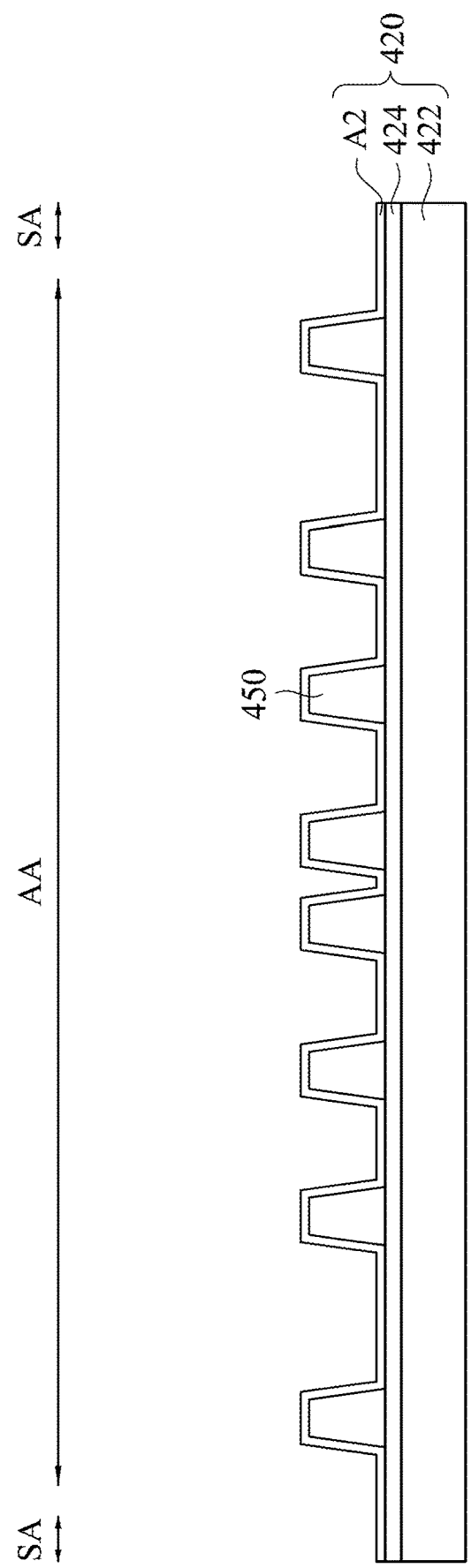
FIGS. 4A-4C illustrate intermediate stages of a method for fabricating a liquid crystal phase modulation device according to some embodiments of the present disclosure.
Figure 4B:
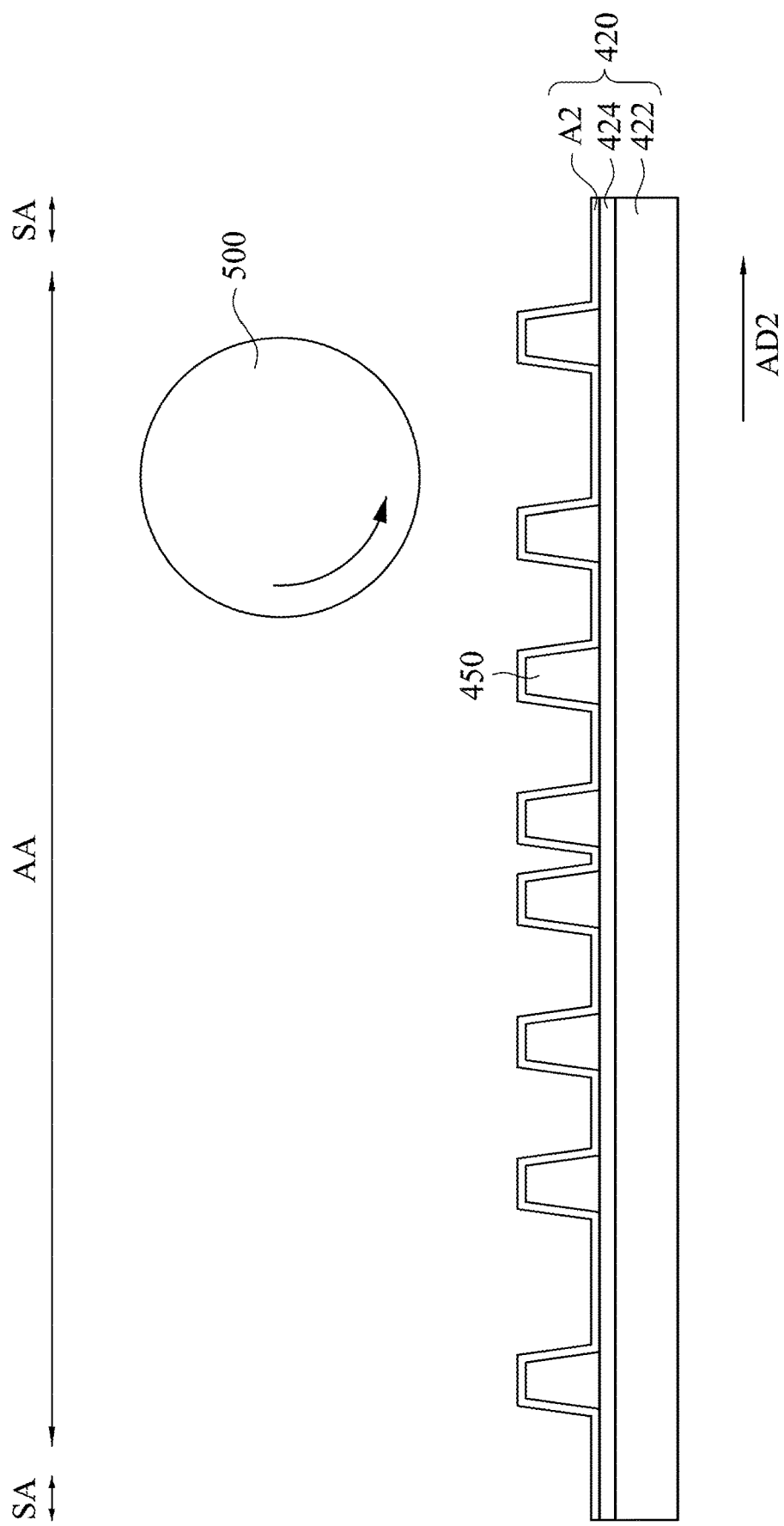
Figure 4C:
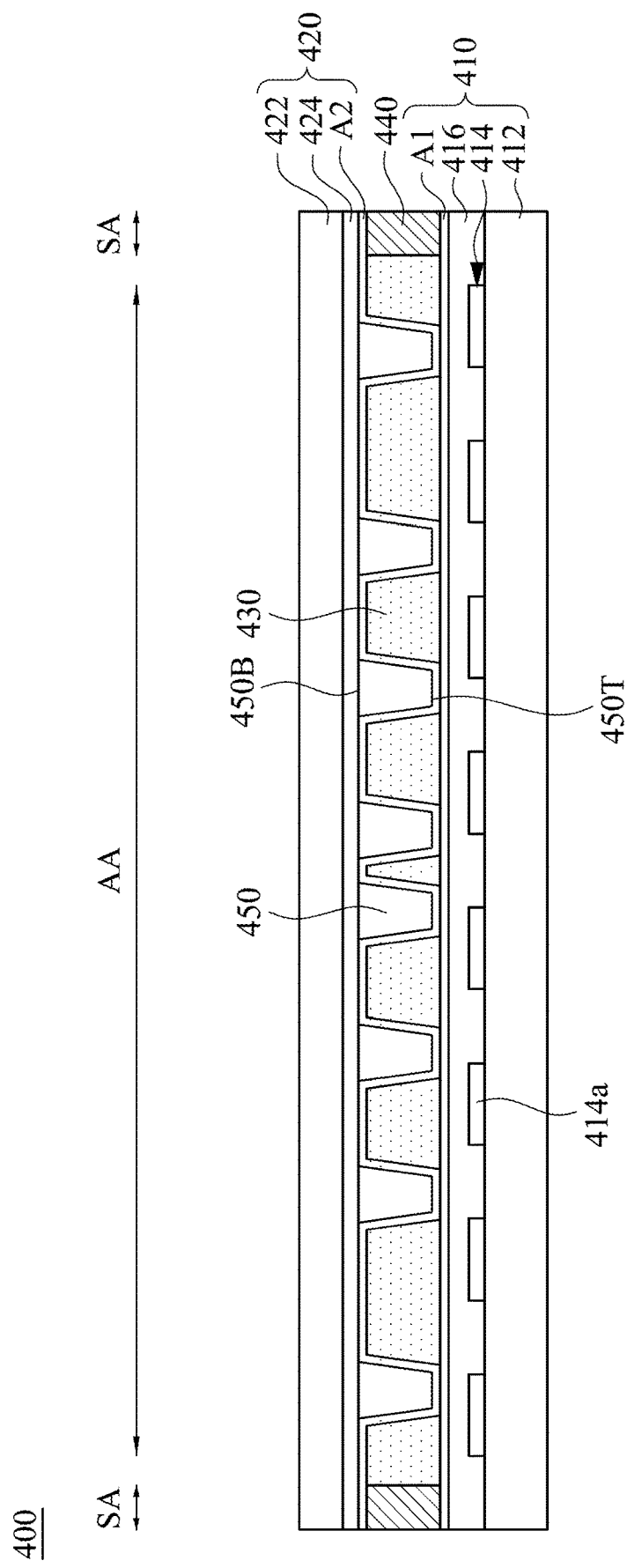

FIGS. 4A-4C illustrate intermediate stages of a method for fabricating a liquid crystal phase modulation device according to some embodiments of the present disclosure. Referring to FIG. 1 and FIG. 4A, the method proceeds to step 110 where spacers 450 are formed on the second substrate 420, instead of formed on the first substrate 410 as shown by FIG. 3F. The configuration of the second substrate 420 is similar to those aforementioned, and therefore not repeated herein.

Referring to FIG. 1 and FIG. 4B, the method 100 proceeds to step 112 where a rubbing process is performed to the alignment layer A2. In some embodiments, a rubbing cloth 500 held by a roller is used to rub the alignment layer A2 in an alignment direction AD2. In some embodiments, the spacers 450 are designed to have a long axis LA parallel as the alignment direction AD2, for example, as shown by FIGS. 7A and 7B, such that the spacers 450 may shelter less area, and the alignment layer A2 is rubbed more effectively.

Referring to FIG. 1 and FIG. 4C, the method 100 proceeds to step 114 where the second substrate 420 is combined with the first substrate 410 and the liquid crystal layer 430, thereby obtaining the liquid crystal phase modulation device 400. The configuration of the first substrate 410 is similar to those aforementioned, and therefore not repeated herein.

As shown in FIG. 4C, a liquid crystal phase modulation device 400 is provided. The liquid crystal phase modulation device 400 includes the first substrate 410, the second substrate 420, the liquid crystal layer 430, a sealant 440, the spacers 450, and the alignment layers A1 and A2. The sealant 440 is in the seal region SA and between the first substrate 410 and the second substrate 420, and surrounds the liquid crystal layer 430. The first electrode layer 414 has first electrodes 414a in the active region AA, while the second electrode layer 424 covers the active region AA. In the present embodiments, the spacers 450 have a bottom surface 450B adjacent to the second substrate 420 and a top surface 450T adjacent to the first substrate 410. The bottom surface 450B has a larger area than that of the top surface 450T. Each of the spacers 450 has a height taken perpendicular to the first substrate 410 corresponding to the cell gap, such that the cell gap is maintained by the spacers 450.

Other details of the present embodiments are similar to those aforementioned, and not repeated herein.

Figure 5:
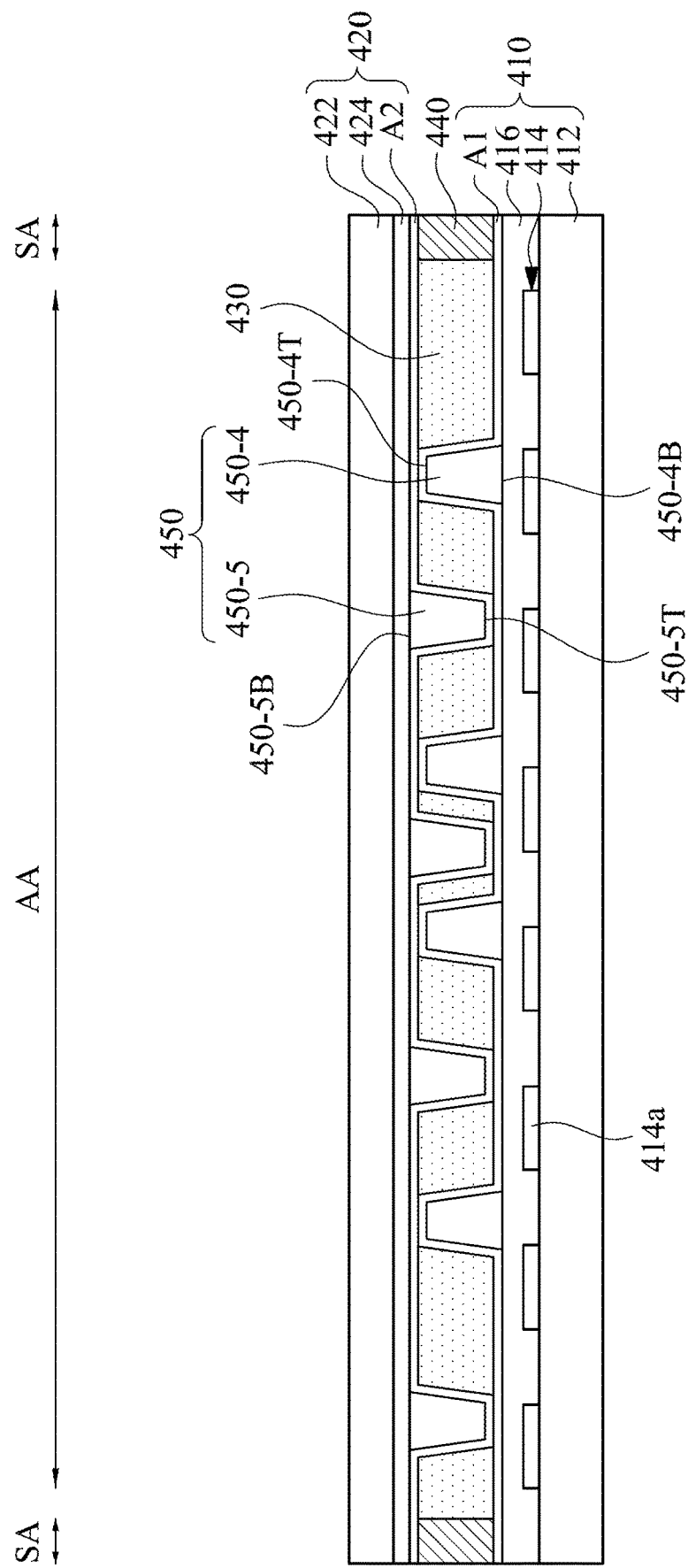
FIG. 5 is a schematic cross-sectional view of a liquid crystal phase modulation device according to some embodiments of the present disclosure.

FIG. 5 is a schematic cross-sectional view of a liquid crystal phase modulation device 400 according to some embodiments of the present disclosure. The present embodiment is similar to the embodiments of FIG. 3G and FIG. 4C, and the difference between the present embodiment and the embodiments of FIG. 3G and FIG. 4C is that: in the present embodiments, a first portion of the spacers 450 (referred to as spacers 450-1 hereinafter) are formed on first substrate 410, while a second portion of the spacers 450 (referred to as spacers 450-5 hereinafter) are formed on the second substrate 420. For example, the spacers 450-1 have a bottom surface 450-1B adjacent to the first substrate 410 and a top surface 450-1T adjacent to the second substrate 420, and the spacers 450-5 have a bottom surface 450-5B adjacent to the second substrate 420 and a top surface 450-5T adjacent to the first substrate 410. The bottom surfaces 450-4B and 450-5B have a larger area than that of the top surfaces 450-4T and 450-5T, respectively. In some embodiments, the size or shapes of the spacers 450-4 and 450-5 may be the same or different. Other details of the present embodiments are similar to those aforementioned, and not repeated herein.

Figure 6:
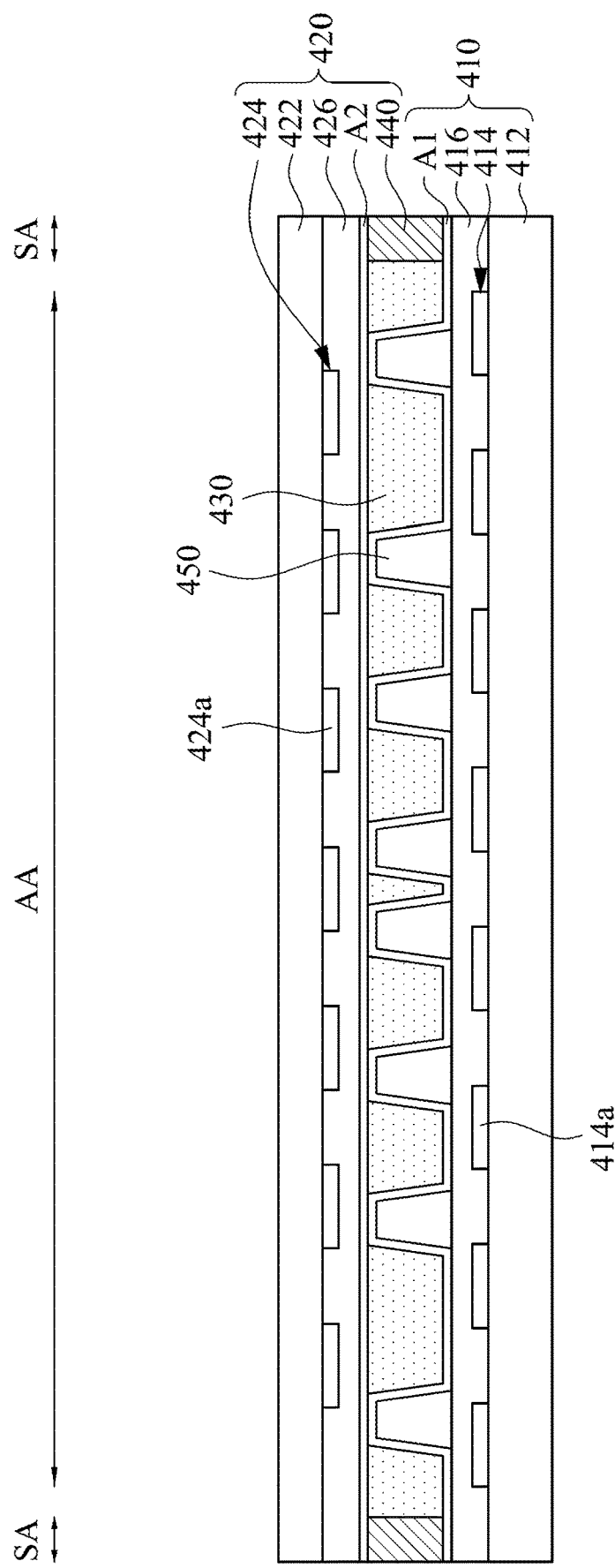
FIG. 6 is a schematic cross-sectional view of a liquid crystal phase modulation device according to some embodiments of the present disclosure.

FIG. 6 is a schematic cross-sectional view of a liquid crystal phase modulation device 400 according to some embodiments of the present disclosure. The present embodiment is similar to the embodiment of FIG. 3G, and the difference between the present embodiment and the embodiment of FIG. 3G is that: the first electrode layer 414 has first electrodes 414a in the active region AA, and the second electrode layer 424 has second electrodes 424a in the active region AA. In some embodiments, the first electrodes 414a and the second electrodes 424a may have the same pitch, but it should not limit the scope of the present embodiments. In some other embodiments, the second electrodes 424a may have a pitch different from that of the first electrodes 414a. Other details of the present embodiments are similar to those aforementioned, and not repeated herein.

Based on the above discussions, it can be seen that the present disclosure offers advantages over liquid crystal devices. It is understood, however, that other embodiments may offer additional advantages, and not all advantages are necessarily disclosed herein, and that no particular advantage is required for all embodiments. One advantage is that spacers are distributed in response to the bending of the substrate, so as to keep a cell gap of a liquid-crystal device uniform. Another advantage is that the shape of the spacers is designed to less influence a rubbing procedure, such that a rubbed alignment layer can effectively align the liquid crystal molecules.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method for fabricating a liquid crystal phase modulation device, comprising:
    combining a first reference substrate, a second reference substrate, a reference sealant, and a reference liquid crystal layer to form a reference liquid crystal phase modulation sample;
    after combining the first reference substrate, the second reference substrate, the reference sealant, and the reference liquid crystal layer to form the reference liquid crystal phase modulation sample, detecting thicknesses of a plurality of portions of the reference liquid crystal layer of the reference liquid crystal phase modulation sample by a detected apparatus;

determining a distribution according to the detected thicknesses of the portions of the reference liquid crystal layer;

forming a plurality of first spacers over a first substrate in the determined distribution; and combining the first substrate with a second substrate and a liquid crystal layer to form the liquid crystal phase modulation device, wherein combining the first substrate with the second substrate and the liquid crystal layer to form the liquid crystal phase modulation device comprises:
 disposing a device sealant over the first substrate; and
 bonding the first substrate and the second substrate such that the liquid crystal layer and the device sealant are between the first and second substrates, wherein the device sealant has a thickness substantially equal to a thickness of the reference sealant of the reference liquid crystal phase modulation sample.

2. The method of claim 1, further comprising:
forming an alignment layer over the first substrate and the first spacers after forming the first spacers; and
rubbing the alignment layer in an alignment direction.

3. The method of claim 1, wherein forming the first spacers is performed such that at least one of the first spacers has a first length in a first direction and a second length in a second direction perpendicular to the first direction, and the first length is greater than the second length.

4. The method of claim 3, further comprising:
forming an alignment layer over the first substrate and the first spacers after forming the first spacers; and
rubbing the alignment layer in an alignment direction, wherein the alignment direction is parallel with the first direction.

5. The method of claim 4, wherein forming the first spacers is performed such that said at least one of the first spacers has a first portion tapering toward the alignment direction as viewed from top.

6. The method of claim 5, wherein forming the first spacers is performed such that said at least one of the first spacers has a second portion tapering away from the alignment direction as viewed from top.

7. The method of claim 1, wherein combining the first reference substrate, the second reference substrate, the reference sealant, and the reference liquid crystal layer is performed such that the reference liquid crystal phase modulation sample is free of a spacer in the reference liquid crystal layer.

8. The method of claim 1, wherein the thickness of the device sealant is in a range from 10 micrometers to 50 micrometers, and the thickness of the reference sealant is in a range from 10 micrometers to 50 micrometers.

9. The method of claim 1, wherein the first substrate has an active region and a seal region surrounding the active region, and forming the first spacers in the determined distribution is performed such that a density of the first spacers between a first edge of the active region and a center of the active region degrades as approaching the first edge of the active region.

10. The method of claim 9, wherein forming the first spacers in the determined distribution is performed such that a density of the first spacers between a second edge of the active region and the center of the active region degrades as approaching the second edge of the active region, wherein the second edge of the active region is not parallel with the first edge of the active region.

11. The method of claim 9, wherein a length or a width of the active region is in a range of 1 inch to 2 inches.

12. The method of claim 1, wherein the first substrate has an active region and a seal region surrounding the active region, and forming the first spacers in the determined distribution is performed such that a density of the first spacers between an edge of the active region and a center of the active region is substantially proportional to a factor, the factor is represented as $PF_i+q(100\%-PF_i)$, and $PF_i$ is inversely proportional to $a \times FDX_i+b$, wherein i is a positive integer, $FDX_i$ is a distance between an $i^{th}$ position of the first spacers and the edge of the active region, a, b, and q are constants, and q is in a range of 0 to 1.

13. The method of claim 1, wherein the detected thicknesses of the portions of the reference liquid crystal layer are in a range from 10 micrometers to 50 micrometers.

14. The method of claim 1, wherein a height of the first spacers is in a range from 10 micrometers to 50 micrometers.

15. The method of claim 1, further comprising:
forming a plurality of second spacers over the second substrate in the determined distribution prior to combining the first substrate with the second substrate and the liquid crystal layer to form the liquid crystal phase modulation device, wherein a height of the second spacers is substantially equal to that of the first spacers.

16. The method of claim 15, further comprising:
forming an alignment layer over the second substrate and the second spacers after forming the second spacers; and
rubbing the alignment layer in an alignment direction.

17. A method for fabricating a liquid crystal phase modulation device, comprising:
fabricating a reference liquid crystal phase modulation sample by combining a first reference substrate, a second reference substrate, a reference sealant, and a reference liquid crystal layer;
after fabricating the reference liquid crystal phase modulation sample by combining the first reference substrate, the second reference substrate, the reference sealant, and the reference liquid crystal layer, detecting thicknesses of a plurality of portions of the reference liquid crystal layer of the reference liquid crystal phase modulation sample by a detected apparatus;
determining a distribution according to the detected thicknesses of the portions of the reference liquid crystal layer;
forming a plurality of first spacers over a first substrate in the determined distribution; and
combining the first substrate, a second substrate, a device sealant, a liquid crystal layer to form the liquid crystal phase modulation device, wherein the device sealant has a thickness substantially equal to a thickness of the reference sealant.

18. The method of claim 17, wherein fabricating the reference liquid crystal phase modulation sample is performed such that the reference liquid crystal phase modulation sample is free of a spacer in the reference liquid crystal layer.

* * * * *